US006426982B1

(12) United States Patent
Yang et al.

(10) Patent No.: US 6,426,982 B1
(45) Date of Patent: Jul. 30, 2002

(54) LOW COMPLEXITY MULTIPLE BITS MATCHED FILTER

(75) Inventors: Lin Yang, Fremont; Yan Zhong, San Jose; Kevin Hwang, Cupertino, all of CA (US)

(73) Assignee: Cadonca Design Systems, Inc., San Jose, CA (US)

( * ) Notice: Subject to any disclaimer, the term of this patent is extended or adjusted under 35 U.S.C. 154(b) by 0 days.

(21) Appl. No.: 09/398,939

(22) Filed: Sep. 17, 1999

(51) Int. Cl.$^7$ ................................. H03D 1/00
(52) U.S. Cl. ........................ 375/343; 714/794
(58) Field of Search .................... 375/262, 343; 704/216, 217, 218; 714/786, 794

(56) References Cited

U.S. PATENT DOCUMENTS

| | | | |
|---|---|---|---|
| 4,527,278 A | 7/1985 | Deconche et al. | ............. 375/97 |
| 5,926,786 A | * 7/1999 | McDonough et al. | ........ 704/217 |
| 6,279,133 B1 | * 8/2001 | Vafai et al. | .................. 714/758 |

FOREIGN PATENT DOCUMENTS

| GB | 2344493 A | 6/2000 | ......... H04L/27/233 |
|---|---|---|---|

OTHER PUBLICATIONS

Clark A P et al.: "Doppler–Shift Correction Via Correlation For a Received OPSK Signal"; IEE Proceedings I. Solid–State & Electron Devices; vol. 137, No. 6, Part 01; Dec. 1, 1990, pp. 387–394, XPOOO179891; GB, Institution of Electrical Engineers; ISSN: 0956–3776, p. 387, col. 2, line 11–20; p. 388, col. 2, last paragraph, figure 1.

* cited by examiner

*Primary Examiner*—Don N. Vo
(74) *Attorney, Agent, or Firm*—John Schipper

(57) ABSTRACT

Method and system for efficiently and quickly forming a sequence of convolution values from an over-sampled digital signal sequence. Convolution value differences are computable from a set of digital signal values that is smaller than the original set of signal values by a factor of R, the over-sampling rate. The number of adders and the associated time delay for computation of the convolution differences are reduced by at least a factor R and by at least a factor approximately proportional to $\log_2(R)$, respectively, as compared to conventional computation of a convolution value. This approach is used to estimate a time value for which the convolution attains a largest magnitude or value.

22 Claims, 5 Drawing Sheets

LOW COMPLEXITY MULTIPLE BITS MATCHED FILTER

FIELD OF THE INVENTION

This invention relates to digital filtering of multiple bits input signals and computation of correlation or convolution values.

BACKGROUND OF THE INVENTION

In formation of correlation values from digital signals, the number of multiplications required to form a single correlation values can be as large as the number P of time slots or "chips" used to define the signal, if a conventional approach is used for computation of the correlation values. In a code division multiple access (CDMA) approach to communications, the communication symbols are multiplied or "spread" using a fixed pattern of reference symbols, referred to as pseudo-random (PN) code, and transmitted. At the receiver end, an optimal solution for detecting the received symbols, and identifying the particular code used for the spreading, employs a maximum likelihood (ML) decision rule. The ML solution for coded symbols is a matched filter or correlator, with coefficients given by the same PN code, a process known as "despreading". Analysis of a correlation curve for the received signal and determination of the time shift and amplitude of its peak value allows two questions to be answered: (1) Is the reference pattern used to form the correlation curve likely to be the same as the spreading pattern used at the transmitter; and (2) If the answer to the first question is "yes", what is the most likely time shift associated with the received signal.

A CDMA communication system receiver requires use of at least 3·N matched filter values, where N is the number of rake fingers used for the communications. The matched filter coefficients used for despreading account for the largest fraction of the gate count in a CDMA chip and have an associated built-in time delay for the substantial signal processing that is required. For example, in use of Code Division Multiple Access (CDMA) for signal recognition in a Global Positioning System (GPS), the number of chips used is P=1023, which requires about 1023 adders, arranged in about ten layers or more, to compute a single correlation value, and this computation is repeated for each of the approximately 1023 time shifts in order to compute a set of values for a full correlation curve. The time delay for (a minimum of) ten processing layers can be many tens of nanoseconds.

A second category where PN codes are used is in frame synchronization in digital communications. The transmitted information symbols are divided and packed into frames that also carry header and trailer information (overhead), including a preamble for synchronization of the remainder of an asynchronously transmitted frame. A PN code or "unique word" (UW) is included to assist in detecting the beginning point of the payload within a frame. The receiver searches for the UW within a frame, and an optimal solution is an ML synchronizer. Again, this requires use of a matched filter or correlator, with coefficients given by the UW used in the frame. Again, the matched filter coefficients used for pattern recognition account for the largest fraction of the gate count in frame synchronization.

What is needed is an approach that reduces the number of arithmetic operations used in formation of a correlation value used in CDMA communications, in frame synchronization and in any other signal processing procedure requiring formation of one or more correlation values. Preferably, the approach should have reduced complexity and should allow use of a much smaller gate count and have a smaller associated time delay for computation of each correlation value. Preferably, the approach should be flexible enough to accommodate a signal of any magnitude, using any signal representation format (binary, quaternary, octal, binary coded decimal, hexadecimal, etc.) and using any signal over-sampling rate.

SUMMARY OF THE INVENTION

These needs are met by the invention, which reduces the number of addition operations from M·N·R to a maximum of M·N, where M is the maximum number of orders of magnitude needed to represent a signal magnitude (e.g., M=1 for up to 10, M=2 for up to 100, etc. in decimal base), N is the number of binary digits used to represent a single "order of magnitude" (e.g., N=3 for octal, N=4 for a decimal or hexadecimal order of magnitude), and R is the over-sampling rate used for signal reception (e.g., R=2–10, or higher). The invention computes differences between two consecutive correlation values, rather than computing each correlation value separately, and this allows reduction, by a multiplicative factor of at least R, depending upon the structure of the reference or coding word, in the number of arithmetic operations for computation of a correlation value. The number of gates required is reduced by the same factor, and the associated time delay for computation of a correlation value is reduced by at least $\Delta t(add) \cdot \log_2(R)$, where $\Delta t(add)$ is the time required to perform an addition of two values. Optionally, a time shift point at which the correlation curve reaches a maximum is automatically identified by this approach, and the corresponding (maximum) correlation value is quickly recovered after this time shift point has been identified.

DETAILED DESCRIPTION OF THE INVENTION

Figure 1:
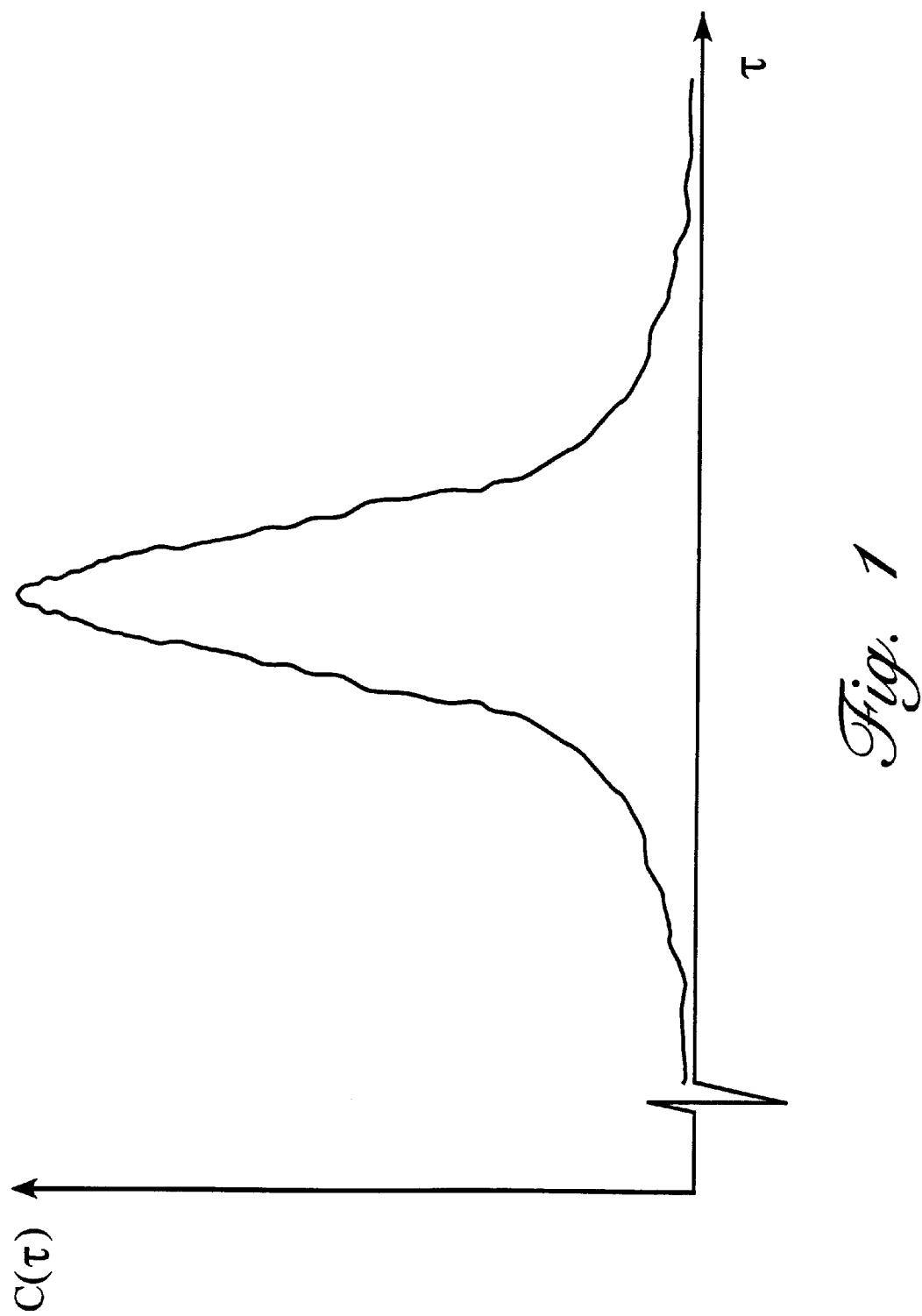
FIG. 1 is a graphical view of a representative correlation curve for a received signal.

FIG. 1 is a graph of an idealized autocorrelation function that might be formed from a received digital signal s(t;rec), which is generally expressible as a multi-bit numerical value. Each time point $t_n$ corresponds to a time shift for a convolution value $C(t_n)$, computed as $$C(t_n) = \sum_{k=1}^{K} s(t_k; rec) \cdot s(t_n - t_k; ref), \quad (1)$$

where s(t;ref) is the reference signal used at the receiver to implement pattern recognition for the received signal and $\{t_k\}$ is a sequence of time points (not necessarily equidistantly spaced) used to compute a correlation value for the received signal. The time shift $\Delta t(max)$ corresponding to the position where the maximum amplitude of the correlation curve in FIG. 1 may be, but need not be, precisely equal to one of the time shift values $t_n$ used to compute the convolution values.

Use of the invention is first illustrated by an example. A PN code signal has an amplitude s(t;ref)=789, which is represented in hexadecimal format as an ordered sequence 0111/1000/1001. The received signal is over-sampled at a selected rate R, for example, R=4, so that each of 12 signal values representing the received signal s(t;rec) is appears four consecutive times. A "modified hexadecimal format", in which the binary value "0" is replaced by the numerical value "−1", is adopted here to more easily illustrate operation of the invention. A modified form of the invention will also work with the conventional hexadecimal format representation. Adopting the modified hexadecimal format, the over-sampled expression for PN Code amplitude s(t;ref)= 789 becomes $$\{s(t;ref)\}=-1-1-1-1111111111111111-1-1-1-1-1-1-1-1-1-1- \\ 1-1111-1-1-1-1-1-1-1-1111. \quad (2)$$

This number has 48=3·4·4 binary digits in its representation, including factors corresponding to an order of magnitude number, M=3, a hexadecimal (or decimal) representation number, N=4, and an oversampling rate number, R=4, in this example. The time shifts $t_n$ are equidistant so that $t_{n+1}-t_n=\Delta t$=constant.

Figure 2:
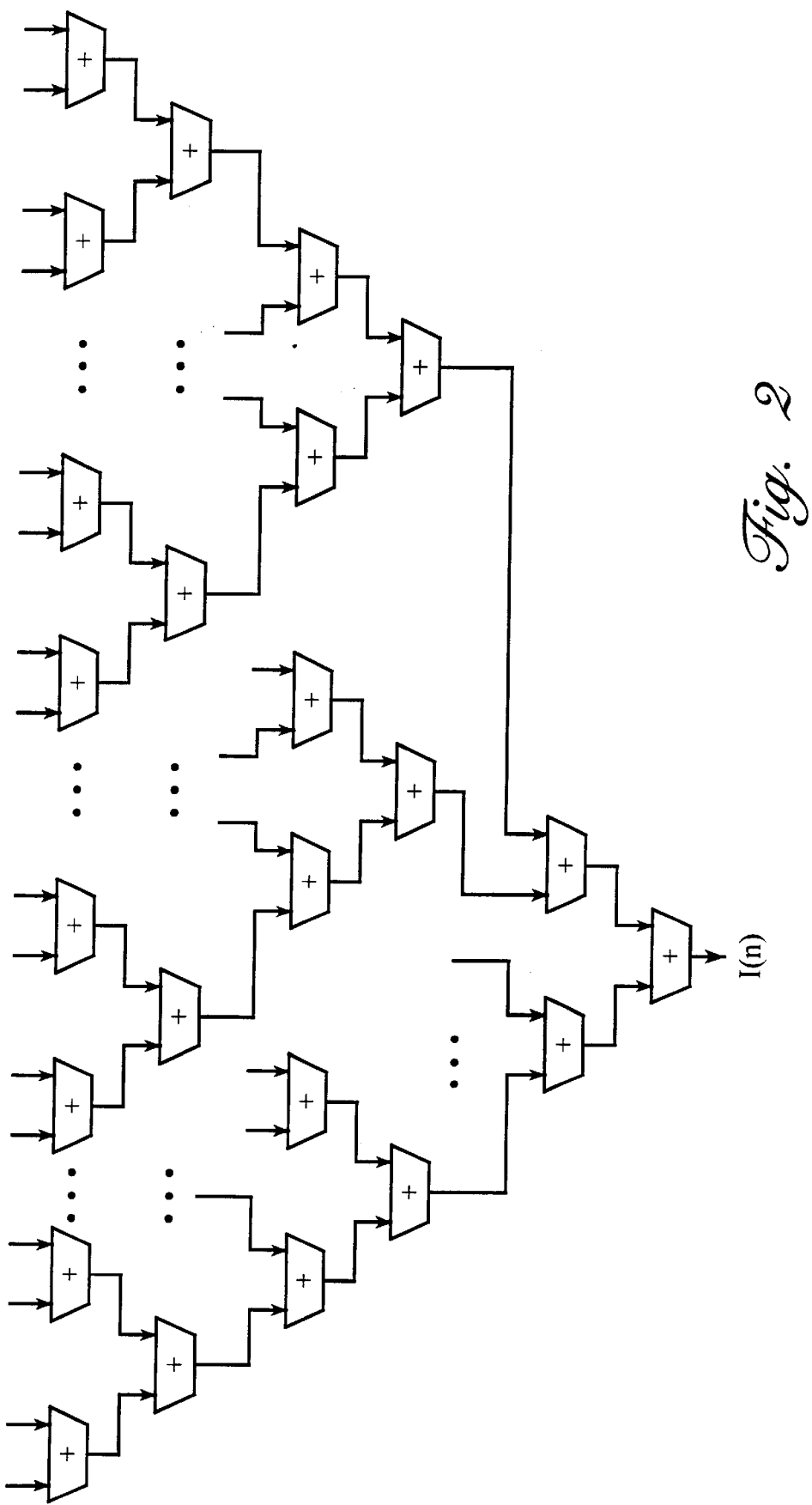
FIG. 2 illustrates a gate array used to compute correlation values according to a conventional approach.

In a conventional approach to computation of the correlation values using this PN Code, a sequence of time shifts $t_n$ is applied to the over-sampled reference signal values $s(t_k;ref)$, and the resulting signal values are multiplied by the received signal values, as indicated in Eq. (1). For any selected value of the time shift $t_n$, computation of the corresponding correlation value requires use of 48 signal value multipliers and use of 47 (or 48) adders, which may be arranged six layers containing 24, 12, 6, 3, 2 and 1 two-input adders as shown in FIG. 2. The associated time delay $\Delta t$(conv) for conventionally processing a received signal to provide a single correlation value is six times the time delay $\Delta t$(add) associated with addition of two values at a single adder. More generally, the associated time delay is approximately $\{\log_2[M\cdot N\cdot R]\}_+$, where $\{P\}_+$ is the smallest integer that is greater than or equal to the real number P; this is related to, but not the same as, the integer part, $[P]_+$, of the real number P. For this example, the associated time delay is $\Delta t$(add)·$\{\log_2[3\cdot4\cdot4]\}_+$, =$\Delta t$(add)·$\{5.585\}_+$=6·$\Delta t$(add).

For the example chosen, the convolution values $C(t_n)$ defined in Eq. (1) become $$C(n\cdot\Delta t) = \sum_{k=1}^{K} s(k\cdot\Delta t; rec)\cdot PN((n-k)\cdot\Delta t), \quad (3)$$

where the sequence of PN code values is set forth in Eq. (2). The difference of two consecutive convolution values is verified to be $$\Delta C(t_{n+1}) = C(t_{n+1}) - C(t_n) \quad (4)$$

$$= \sum_{k=1}^{47} s(k\cdot\Delta t; rec)\cdot\{PN((n+1-k)\cdot\Delta t) -$$

$$PN((n-k)\cdot\Delta t)\} + s(48\cdot\Delta t; rec)\cdot PN((n+1-48)\cdot\Delta t) -$$

$$s(0\cdot\Delta t; rec)\cdot PN(n\cdot\Delta t)$$

$$= \sum_{k=0}^{48} s(k\cdot\Delta t; rec)\cdot w(n;k),$$

$$w(n;k) = 0 \quad (n-k \text{ not divisible by 4}) \quad (5)$$

$$= PN((n+1-48)\cdot\Delta t) \quad (k=48)$$

$$= -PN(n\cdot\Delta t) \quad (k=0)$$

$$= 2 \quad (n-k=4\cdot u; PN(4\cdot u) = -PN(4\cdot u+1) = -1; k \neq 0, 48)$$

$$= 0 \quad (n-k=4\cdot u; PN(4\cdot u) = PN(4\cdot u+1))$$

$$= -2 \quad (n-k=4\cdot u; PN(4\cdot u) = -PN(4\cdot u+1) = +1),$$

where u=0, ±1, ±2, ±3, . . . One verifies that the convolution value difference, $C((n+1)\cdot\Delta t)-C(n\cdot\Delta t)$, includes at most 13=3·4+1 terms, corresponding to the integer values of k in the convolution sum in Eq. (3) for which the integer difference, n−k, is divisible by 4 (n−k=0, 1, 2, . . . , 48). In the particular example with a PN code of 789, of the indices for which n−k is divisible by 4, a sequence of 13 consecutive values of the coefficients w(n;k) becomes $$w(n;k)=\{-1, 2, 0, 0, 0, -2, 0, 0, 2, -2, 0, 2, 1\} \quad (6)$$

with the first and thirteenth values w(n;k) (=+1 or −1) being determined by individual PN Code values, rather than Code differences.

This example has used the particular choices

M=maximum order of magnitude of reference signal=3,

N=number of binary digits used for each order of magnitude=4,

R=over-sampling rate=4.

Figure 3:
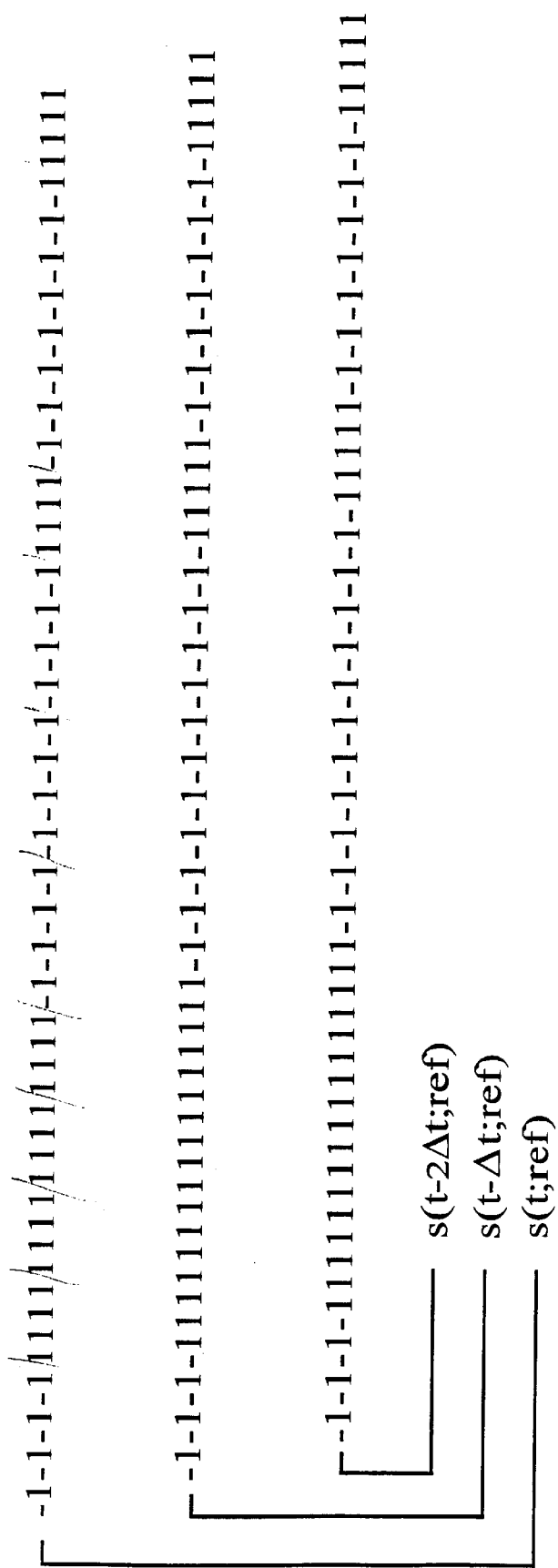
FIG. 3 illustrates overlapping arrays of over-sampled PN Code values (±1) used in an example that explains use of the invention.

FIG. 3 illustrates the 48 values of the PN Code represented in Eq. (2), for the shifted time values s(t;ref), s(t+$\Delta t$;ref) and s(t+2$\Delta t$;ref). Each of these three sequences of 48 numbers is multiplied by corresponding members of a digital signal sequence s(t;rec), as indicated in Eq. (1). Because of the over-sampling rate (R=4) adopted in this example, every fourth value of the sequence in FIG. 3 representing s(t;ref) is a potential "boundary point", where the PN Code sequence members s(t;ref) and s(t+$\Delta t$;ref) can have different signs (e.g., +1/−1 or −1/+1). Similarly, every fourth value of the sequence representing s(t+$\Delta t$;ref) is a potential "boundary point", where s(t+$\Delta t$;ref) and s(t+2$\Delta t$;ref) have different signs. Where two time-shifted sequences, such as s(t;ref) and s(t+$\Delta t$;ref) have the same sign (e.g., +1/+1 or −1/−1) at such a boundary point, this boundary point will not contribute a non-zero value to a convolution value difference $C(t_n)-C(t_{n-1})$.

Figure 4A:
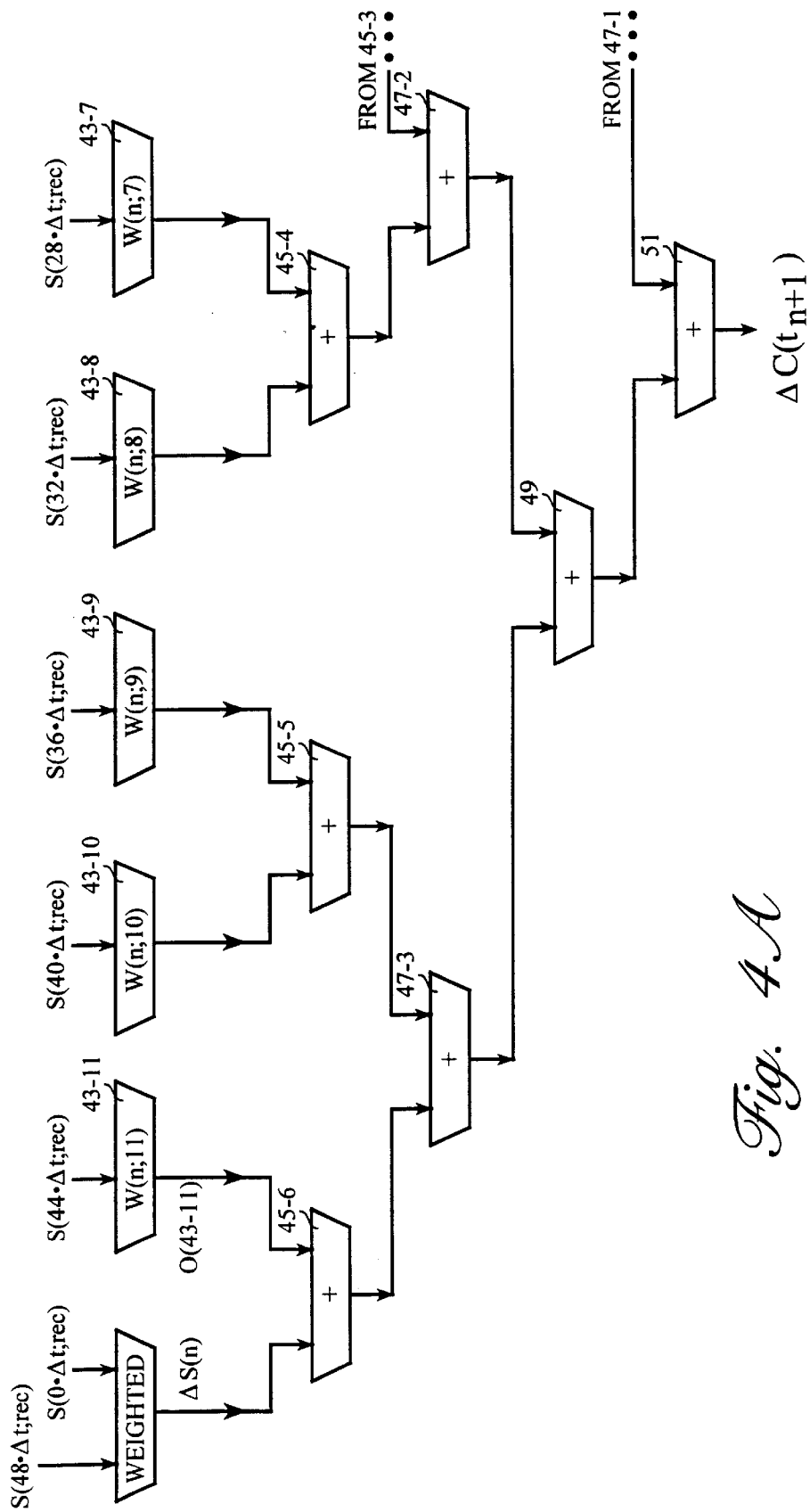
FIG. 4 illustrates a gate array used to compute correlation values according to the invention, corresponding to the conventional approach in FIG. 2.
Figure 4B:
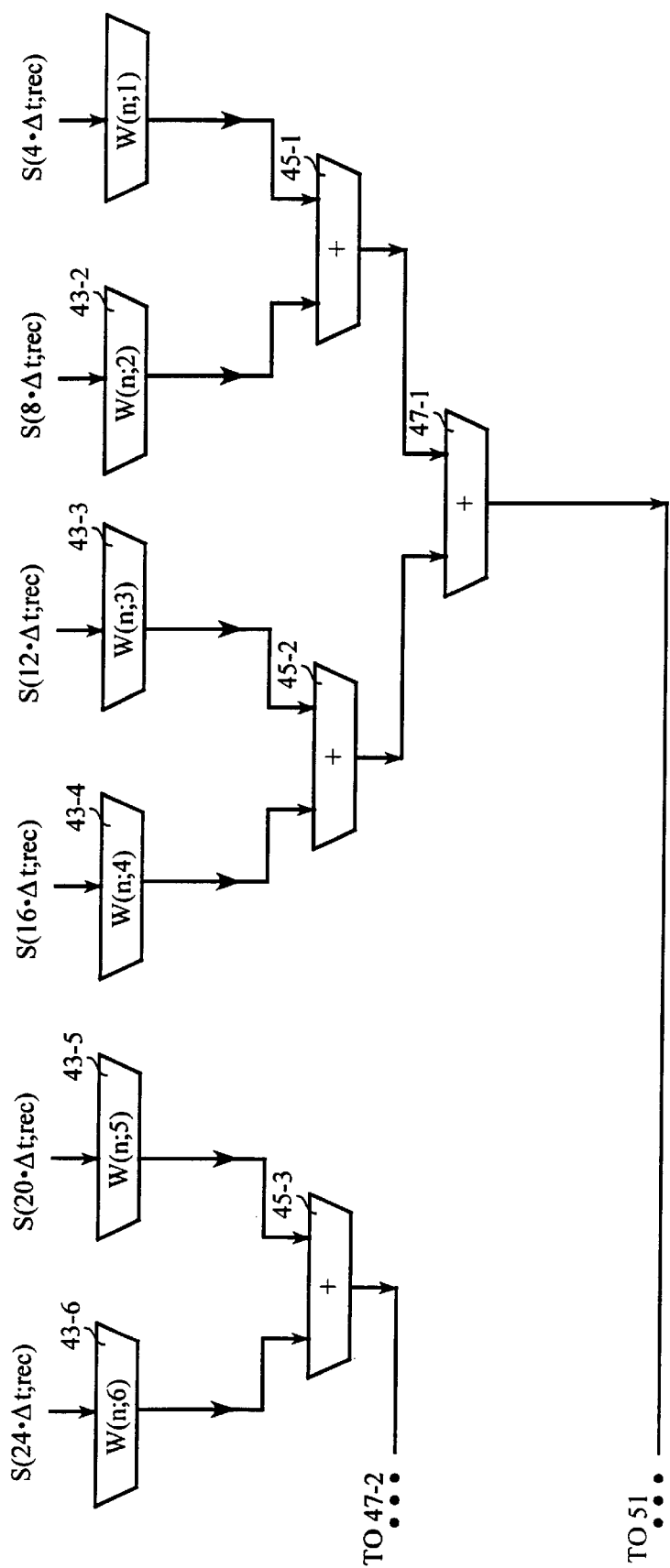

FIG. 4 illustrates an array 41 of coefficient multipliers and signal summers that can be used to form a convolution value difference for the example considered here, with M=3, N=4 and R=4 but with an arbitrary PN code. The top level of the array has a maximum of M·N−1=11 coefficient multiplier modules 43-k, each with an associated coefficient w(n;k) for k=1, 2, . . . , 11 that has a value +2, 0, or −2, depending upon the particular PN Code used, plus one signal differencer that receives the signals s(48·$\Delta t$;rec) and s(0;rec) and forms and issues a weighted difference $$\Delta s(n)=s(48\Delta t;rec)PN((n+1-48)\cdot\Delta t)-s(0;rec)\cdot PN(n\cdot\Delta t). \quad (7)$$

The output signal for the coefficient multiplier module 43-k is $$O(43\text{-}k) = w(n;k) \cdot s(4 \cdot k \cdot \Delta t; \text{rec}). \tag{8}$$

For the PN Code 789 used in the preceding example, w(n;1)=w(n;8)=w(n;11)=+2, w(n;4)=w(n;10)=−2.

w(n;2)=w(n;3)=w(n;5)=w(n;6)=w(n;7)=w(n;9)=0, as can be verified from Eq. (6). The second array level from the top has six two-input signal adders 45-j (j=1, 2, . . . , 6) producing six output sum signals. The third array level from the top has three two-input signal adders 47-h (h=1, 2, 3), producing three output sum signals. The fourth array level from the top has one two-input adder 49; and the fifth array level from the top has one two-input signal adder 51, whose output signal is the convolution value difference $\Delta C(t_n)$ for some index value n. The array 41 in FIG. 4 has M·N−1=11 signal coefficient multipliers at the top level and four levels with an additional 12 signal adders. The maximum associated time delay is approximately 5·Δt(add). The number of gates required is a maximum of 23 (18 for the PN Code 789 chosen for this example), as compared with 47 for the conventional approach for convolution.

More generally, the convolution value set forth in Eq. (4) can be expressed as $$\Delta C(t_{n+1}) = C(t_{n+1}) - C(t_n) \tag{9}$$

$$= \sum_{k=0}^{M \cdot N \cdot R} s(k \cdot \Delta t; \text{rec}) \cdot \{PN((n+1-k) \cdot \Delta t) - PN((n-k) \cdot \Delta t)\}$$

$$= \sum_{k=0,}^{M \cdot N \cdot R} s(k \cdot \Delta t; \text{rec}) \cdot W(n; k),$$

$$W(n; k) = 0 \quad (n - k \text{ not divisible by } R) \tag{10}$$

$$= PN((n+1-M \cdot N \cdot R) \cdot \Delta t) \quad (k = M \cdot N \cdot R)$$

$$= -PN(n \cdot \Delta t) \quad (k = 0)$$

$$= 2 \quad (n - k = R \cdot u; PN(R \cdot u) = -PN(R \cdot u + 1) = -1)$$

$$= 0 \quad (n - k = R \cdot u; PN(R \cdot u) = PN(R \cdot u + 1))$$

$$= -2 \quad (n - k = R \cdot u; PN(R \cdot u) = -PN(R \cdot u + 1) = +1),$$

and the maximum number of terms to be added to compute the convolution difference is M·N+1. Multiplication by a factor of 2 is implemented using a one-bit shift of a binary-expressed value.

The innovative procedure begins with computation or provision of a first convolution value $$C(t_1) = \sum_{k=0}^{M \cdot N \cdot R} s(t_k; \text{rec}) \cdot s(t_1 - t_k; \text{ref}). \tag{11}$$

This first convolution value may be known from other considerations (e.g., $C(t_1)=0$) and may not need to be computed. For $n \geq 1$, only the convolution differences, $\Delta C(t_{n+1}) = C(t_{n+1}) - C(t_n)$, as set forth in Eq. (9), are computed. The total number of additions (and multiplications by 2) required here is at most M·N and may be less, depending upon the values of the coefficients W(n;k) as set forth in Eq. (10). One can verify that the number of layers of two-input adders needed to accomplish these M·N value additions is at most $\{\log_2[M \cdot N]\}_+$. If K-input adders (K≥2) are substituted for the two-input adders, the number of layers of K-input adders needed to accomplish these M·N value additions is reduced to at most $\{\log_K[M \cdot N]\}_+$. Each factor-of-two multiplication required by the coefficients W(n;k) in Eq. (10) can be implemented by shifting left by one binary digit in a shift register. If a particular convolution value, say $C(t_m)$, is needed, this value is computed using the relation $$C(t_m) = C(t_1) + \sum_{n=1}^{m} \{C(t_n) - C(t_{n-1})\}. \tag{12}$$

For the particular example discussed in the preceding, FIG. 4 illustrates a suitable array to compute the convolution value differences. This array requires at most $\{\log_2[M \cdot N]\}_+ = 4$ layers, as opposed to $\{\log_2[M \cdot N \cdot R]\}_+ = 6$ for the conventional approach, and requires at most M·N=12 adders, as opposed to M·N·R=48 for the conventional approach.

The integer M depends upon the "order of magnitude" chosen for the PN code. The preceding discussion relies upon use of a hexadecimal format, in which N=4 consecutive binary digits are used to express each order of magnitude value, such as a decimal. Use of a decimal format would also require N=4, because use of at least four binary digits is required to express the values 8 and 9 in a binary system. One can also express an order of magnitude value in octal format, using N=3 consecutive binary digits. In an octal format, the largest order of magnitude value becomes 7 (expressed as 111 in an octal format), not the maximum order of magnitude value 9 of a decimal format or the value F (equivalent to 15) of a hexadecimal format.

The innovative method disclosed here uses single unit differences $\Delta C(t_{n+1})=C(t_{n+1})-C(t_n)$, as set forth in Eq. (9), to quickly compute the convolution values themselves, as set forth in Eq. (12). Double unit differences $$\Delta_2 C(t_{n+2}) = C(t_{n+2}) - C(t_n) \tag{13}$$

$$= \Delta C(t_{n+2}) + \Delta C(t_{n+1})$$

can be computed in a similar manner, if desired, using a sum of single unit differences, as computed in the preceding. More generally, one can compute p-unit differences $$\Delta_p C(t_{n+p}) = C(t_{n+2}) - C(t_n) \tag{14}$$

$$= \sum_{k=1}^{p} \Delta C(t_{n+k})$$

in a similar manner, if desired.

The innovative approach disclosed here is also useful in estimating the time shift value Δt(max) that corresponds to a local maximum value of the convolution value $C(t_n)$, where Δt(max) need not coincide with one of the discrete time shift values $t_n$ but may lie between two discrete time shift values. Assume that $t_{m-1}$, $t_m$, and $t_{m+1}$ are three consecutive time shift points for the correlation curve in FIG. 1, and that the time shift value Δt(max) lies between $t_{m-1}$ and $t_{m+1}$. This situation assumes that the consecutive convolution values $C(t_{m-1})$, $C(t_m)$ and $C(t_{m+1})$ satisfy the constraint $$C(t_m) \geq \max\{C(t_{m-1}), C(t_{m+1})\}. \tag{15}$$

This constraint may be expressed in an equivalent form for convolution signal differences as a pair of constraints $\Delta C(t_m) \geq 0,$ (16A)

$\Delta C(t_{m+1}) \leq 0.$ (16B)

The value τ(max) can be computed as follows. A second degree (or higher degree) polynomial fit to the correlation values at the time shift points $t_{m-1}$, $t_m$, and $t_{m+1}$, becomes $P(\tau;2) = c0 + c1 \cdot \tau + c2 \cdot \tau^2 \quad (t_{m-1} \leq \tau \leq t_{m+1})$ (17)

$c2 = \{[C(t_{m-1}) - C(t_{m+1})] \cdot (t_m - t_{m+1}) + [C(t_m) - C(t_{m+1})] \cdot (t_{m+1} - t_{m-1})\}/$ (det), (18)

$c1 = \{[C(t_{m-1}) - C(t_{m+1})] \cdot (t_{m+1}^2 - t_m^2) + [C(t_m) - C(t_{m+1})] \cdot (t_{m-1}^2 - t_{m+1}^2)\}/$ (det), (19)

$c0 = C(t_m) - c1 \cdot (t_m) - c2 \cdot (t_m)^2,$ (20)

$\det = \{(t_{m-1} - t_m) \cdot (t_m - t_{m+1}) \cdot (t_{m-1} - t_{m+1})\}^{-1}.$ (21)

The time shift for maximum amplitude is given by $\tau(\max) = -c1/(2 \cdot c2)$ (22)

and the time shift value τ(max) depends only upon the two correlation signal differences, $\Delta C(t_m) = C(t_m) - C(\Delta t_{m-1}) - C(\Delta t_{m+1})$ and $\Delta C(t_{m+1}) = C(\Delta t_{m+1}) - C(\Delta t_m)$, which have already been computed according to the procedure set forth in the preceding.

More generally, the second degree polynomial $P(\tau;2)$ can be replaced by an nth degree polynomial $P(\tau;n)$ ($n \geq 2$), with appropriate constraints imposed on the polynomial values at three or more of the discrete time points $\{t_k\}$, and the time shift value τ(max) that maximizes the polynomial $P(\tau;n)$ within the interval $t_{m-1} \leq \tau \leq t_{m+1}$ can be determined.

In one interpretation, the time shift value τ(max) is identified as an estimate of the time shift value corresponding to the maximum value the convolution value $C(t_k)$ would attain, if the convolution were extended to continuous values of the time variable t.

In a second interpretation, one imposes the conditions (16A) and (16B) and determines or computes a time variable value t=tm' for which $|t_{m'} - \tau| = \min\{|t_{m'} - t_{m-1}|, |t_{m'} - t_m|, |t_{m'} - t_{m+1}|\}.$ (23)

The time variable value $t_{m'}$ is then interpreted as the time shift value, drawn from the discrete set $\{t_k\}$, that produces the maximum convolution value.

In a third interpretation, one imposes the conditions (16A) and (16B) and determines or computes a time variable value $t = t_{m''}$ for which $C(t_{m''}) = \max\{C(t_{m-1}), C(t_m), C(t_{m+1})\},$ (24)

which will normally be $t_{m''} = t_m$.

The time shift value t=τ(max) or $t=t_{m'}$ or $t=t_{m''}$ can be used to determine the most likely time shift in cdma communications, the most likely point at which the payload (data) begins in frame synchronization, or for any other similar purpose involving use of convolution signals.

What is claimed is:

1. A method of forming a sequence of convolution difference values for a sequence of digital signal values, the method comprising:

providing a first ordered sequence $\{s(t_k; rec)\}$ (k=0, 1, 2, . . . ) of digital signal values, with each digital signal value being sampled R times and each order of magnitude being expressible as N consecutive binary digits, where N and R are selected positive integers; and providing a second ordered sequence $\{s(t_p - t_k; ref)\}$ of selected values, expressible as an ordered sequence of at least M·N·R binary digits, forming at least two convolution values from products of members of the first sequence and the second sequence, and forming at least one difference $\Delta C(t_p)$ of two convolution values, $C(t_p)$ and $C(t_{p-1})$, for at least one selected integer p, where the difference is expressed as a sum having at most M·N+1 non-zero terms, where M is a selected positive integer determined by the maximum magnitude of the signal values.

2. The method of claim 1, further comprising forming said difference $\Delta C(t_p)$ as a sum $$\Delta C(t_p) = \sum_{k=1}^{K} w(p;k) \cdot s(t_k; rec)[\cdot s(t_p - t_k; ref)],$$

where K is a selected positive integer that is at least equal to M·N·R+1 and w(p;k) are selected coefficients with at most M·N+1 of these coefficients being non-zero.

3. The method of claim 2, further comprising drawing each of said coefficients w(p;k) from a group values consisting of the numbers +2, +1, 0, −1 and −2.

4. The method of claim 2, wherein said integers k for which said coefficients w(p;k) are non-zero are drawn from a group of integers that satisfy a condition p−k=R·u+v, where u is any integer and v is a selected integer.

5. The method of claim 2, further comprising choosing said integer R from the group of integers consisting of {2, 3, 4, 5, 6, 7, 8, 9, 10}.

6. The method of claim 2, further comprising expressing at least one of said provided signal values $s(t_k; ref)$ in hexadecimal format and choosing said integer N equal to 4.

7. The method of claim 2, further comprising expressing at least one of said provided signal values $s(t_k; ref)$ in octal format and choosing said integer N equal to 3.

8. The method of claim 2, further comprising computing at least one convolution value from said products of terms $s(t_k; rec) \cdot s(t_p - t_k; ref)$ by:

providing a first convolution value $C(t_1)$; and computing at least one additional convolution value $C(t_q)$ by the relation $$C(t_q) = C(t_1) + \sum_{r=2}^{q} \Delta C(t_r),$$

where q is a selected integer greater than 1.

9. The method of claim 2, further comprising estimating a time value t=τ for which said convolution value reaches a maximum by:

computing a sequence of at least two consecutive difference values $\Delta C(t_q)$ and $\Delta C(t_{q+1})$;

determining an integer m for which two consecutive convolution values satisfy two relations $\Delta C(t_m) \geq 0;$ and $\Delta C(t_{m+1}) \leq 0;$ and estimating a time value t=τ for which said convolution value reaches a maximum according to $\tau = -c1/(2 \cdot c2),$ $$c2=\{-(\Delta C(t_{m+1})+\Delta C(t_m))\cdot(t_m-t_{m+1})-\Delta C(t_{m+1})\cdot(t_{m+1}-t_{m-1})\},$$

$$c1=\{-(\Delta C(t_{m+1})+\Delta C(t_m))\cdot(t_{m+1}^2-t_m^2)-\Delta C(t_{m+1})\cdot(t_{m+1}^2-t_m+1^2)\}.$$

10. The method of claim 2, further comprising estimating a time value for which said convolution value reaches a maximum by:

computing a sequence of at least two consecutive difference values $\Delta C(t_q)$ and $\Delta C(t_{q+1})$;

determining an integer m for which two consecutive convolution values satisfy two relations $$\Delta C(t_m) \geq 0$$

and $$\Delta C(t_{m+1}) \leq 0;$$

estimating a time value $t=\tau$ according to $$\tau = -c1/(2\cdot c2),$$

$$c2\{-(\Delta C(t_{m+1})+\Delta C(t_m))\cdot(t_m-t_{m+1})-\Delta C(t_{m+1})\cdot(t_{m+1}-t_{m-1})\},$$

$$c1=\{-(\Delta C(t_{m+1})+\Delta C(t_m))\cdot(t_{m+1}^2-t_m^2)-\Delta C(t_{m+1})\cdot(t_{m-1}^2-t_{m+1}^2)\};$$

selecting a time value $t=t_m{}'$, with m'=m−1, m or m+1, for which $$|t_{m'}-\tau|=\min\{|t_{m-1}-\tau|, |t_m-\tau|, |t_{m+1}-\tau|\};$$

and interpreting the time value $t_{m'}$ as the time value, drawn from a discrete set, for which the convolution attains a maximum value.

11. The method of claim 2, further comprising estimating a time value for which said convolution value reaches a maximum by:

computing a sequence of at least two consecutive difference values $\Delta C(t_q)$ and $\Delta C(t_{q+1})$;

determining an integer m for which two consecutive convolution values satisfy two relations $$\Delta C(t_m) \geq 0$$

and $$\Delta C(t_{m+1}) \leq 0;$$

and interpreting the time value $t_m$ as the time value, drawn from a discrete set, for which the convolution attains a maximum value.

12. A system for forming a sequence of convolution values for a sequence of digital signal values, the system comprising a computer that is programmed:

to provide a first ordered sequence $\{s(t_k;rec)\}$ (k=0, 1, 2, . . . ) of digital signal values, with each digital signal value being sampled R times and each order of magnitude being expressible as N consecutive binary digits, where N and R are selected positive integers; and to provide a second ordered sequence $\{s(t_p-t_k;ref)\}$ of selected values, expressible as an ordered sequence of at least M·N·R binary digits, forming products of members of the first and second sequences, and forming at least two convolution values from products of members of the first sequence and the second sequence, and forming at least one difference $\Delta C(t_p)$ of two convolution values, $C(t_p)$ and $C(t_{p-1})$, for at least one selected integer p, where the difference is expressed as a sum having at most M·N+1 non-zero terms, where M is a selected positive integer.

13. The system of claim 12, wherein said difference $\Delta C(t_p)$ is expressed as sum $$\Delta C(t_p) = \sum_{k=1}^{K} w(p;k)\cdot s(t_k; rec)[\cdot s(t_p - t_k; ref)],$$

where K is a selected positive integer that is at least equal to M·N·R+1 and w(P;k) are selected coefficients with at most M·N+1 of these coefficients being non-zero.

14. The system of claim 13, wherein each of said coefficients w(p;k) is drawn from a group of values consisting of the numbers +2, +1, 0, −1 and −2.

15. The system of claim 13, wherein said integers k for which said coefficients w(p;k) are non-zero are drawn from a group of integers that satisfy a condition p−k=R·u+v, where u is any integer and v is a selected integer.

16. The system of claim 13, said integer R is drawn from the group of integers consisting of {2, 3, 4, 5, 6, 7, 8, 9, 10}.

17. The system of claim 13, wherein at least one of said provided signal values $s(t_k;ref)$ is expressed in hexadecimal format and said integer N is chosen equal to 4.

18. The system of claim 13, at least one of said provided signal values $s(t_k;ref)$ is expressed in octal format and said integer N is chosen equal to 3.

19. The system of claim 13, wherein said computer is programmed to compute at least one convolution value from said products of terms $s(t_k;rec)\cdot s(t_p-t_k;ref)$ by:

providing a first convolution value $C(t_1)$; and computing at least one additional convolution value $C(t_q)$ by the relation $$C(t_q) = C(t_1) + \sum_{r=2}^{q} \Delta C(t_r),$$

where q is a selected integer greater than 1.

20. The system of claim 13, wherein said computer is programmed to estimating a time value $t=\tau$ for which said convolution value reaches a maximum by:

computing a sequence of at least two consecutive difference values $\Delta C(t_q)$ and $\Delta C(t_{q+1})$;

determining an integer m for which two consecutive convolution values satisfy two relations $$\Delta C(t_m) \geq 0$$

and $$\Delta C(t_{m+1}) \leq 0;$$

and estimating a time value $t=\tau$ for which said convolution value reaches a maximum according to $$\tau = -c1/(2\cdot c2),$$

$$c2=\{-(\Delta C(t_{m+1})+\Delta C(t_m))\cdot(t_m-t_{m+1})-\Delta C(t_{m+1})\cdot(t_{m+1}-t_{m-1})\},$$

$$c1=\{-(\Delta C(t_{m+1})+\Delta C(t_m))\cdot(t_{m+1}^2-t_m^2)-\Delta C(t_{m+1})\cdot(t_{m-1}^2-t_{m+1}^2)\}.$$

21. The method of claim 13, wherein said computer is programmed to estimating a time value for which said convolution value reaches a maximum by:

computing a sequence of at least two consecutive difference values $\Delta C(t_q)$ and $\Delta C(t_{q+1})$;

determining an integer m for which two consecutive convolution values satisfy two relations $$\Delta C(t_m) \geqq 0$$

and $$\Delta C(t_{m+1}) \leqq 0;$$

estimating a time value $t=\tau$ according to $$\tau = -c1/2 \cdot c2),$$

$$c2 = \{-(\Delta C(t_{m+1}) + \Delta C(t_m)) \cdot (t_m - t_{m+1}) - \Delta C(t_{m+1}) \cdot (t_{m+1} - t_{m-1})\},$$

$$c1 = \{-(\Delta C(t_{m+1}) + \Delta C(t_m)) \cdot (t_{m+1}^2 - t_m^2) - \Delta C(t_{m+1}) \cdot (t_{m-1}^2 - t_{m+1}^2)\};$$

selecting a time value $t=t_{m'}$, with $m'=m-1$, m or $m+1$, for which $$|t_{m'} - \tau| = \min\{|t_{m-1} - \tau|, |t_m - \tau|, |t_{m+1} - \tau|\};$$

and interpreting the time value $t_{m'}$ as the time value, drawn from a discrete set, for which the convolution attains a maximum value.

22. The method of claim 13, wherein said computer is programmed to estimating a time value for which said convolution value reaches a maximum by:

computing a sequence of at least two consecutive difference values $\Delta C(t_q)$ and $\Delta C(t_{q+1})$;

determining an integer m for which two consecutive convolution values satisfy two relations $$\Delta C(t_m) \geqq 0$$

and $$\Delta C(t_{m+1}) \leqq 0;$$

and interpreting the time value $t_m$ as the time value, drawn from a discrete set, for which the convolution attains a maximum value.

* * * * *

UNITED STATES PATENT AND TRADEMARK OFFICE
CERTIFICATE OF CORRECTION

PATENT NO.    : 6,426,982 B1
DATED         : July 30, 2002
INVENTOR(S)   : Lin Yang, Yan Zhong and Kevin Hwang It is certified that error appears in the above-identified patent and that said Letters Patent is hereby corrected as shown below:

<u>Title page,</u>
Item [73], Assignee, please delete "Cadonca Design Systems, Inc. (San Jose, CA)" and insert -- Cadence Design Systems, Inc. (San Jose, CA) --

Signed and Sealed this

Fourteenth Day of September, 2004

JON W. DUDAS
*Director of the United States Patent and Trademark Office*